(No Model.)
H. E. MUELLER.
METHOD OF COLORING GLASSWARE.
No. 382,105. Patented May 1, 1888.
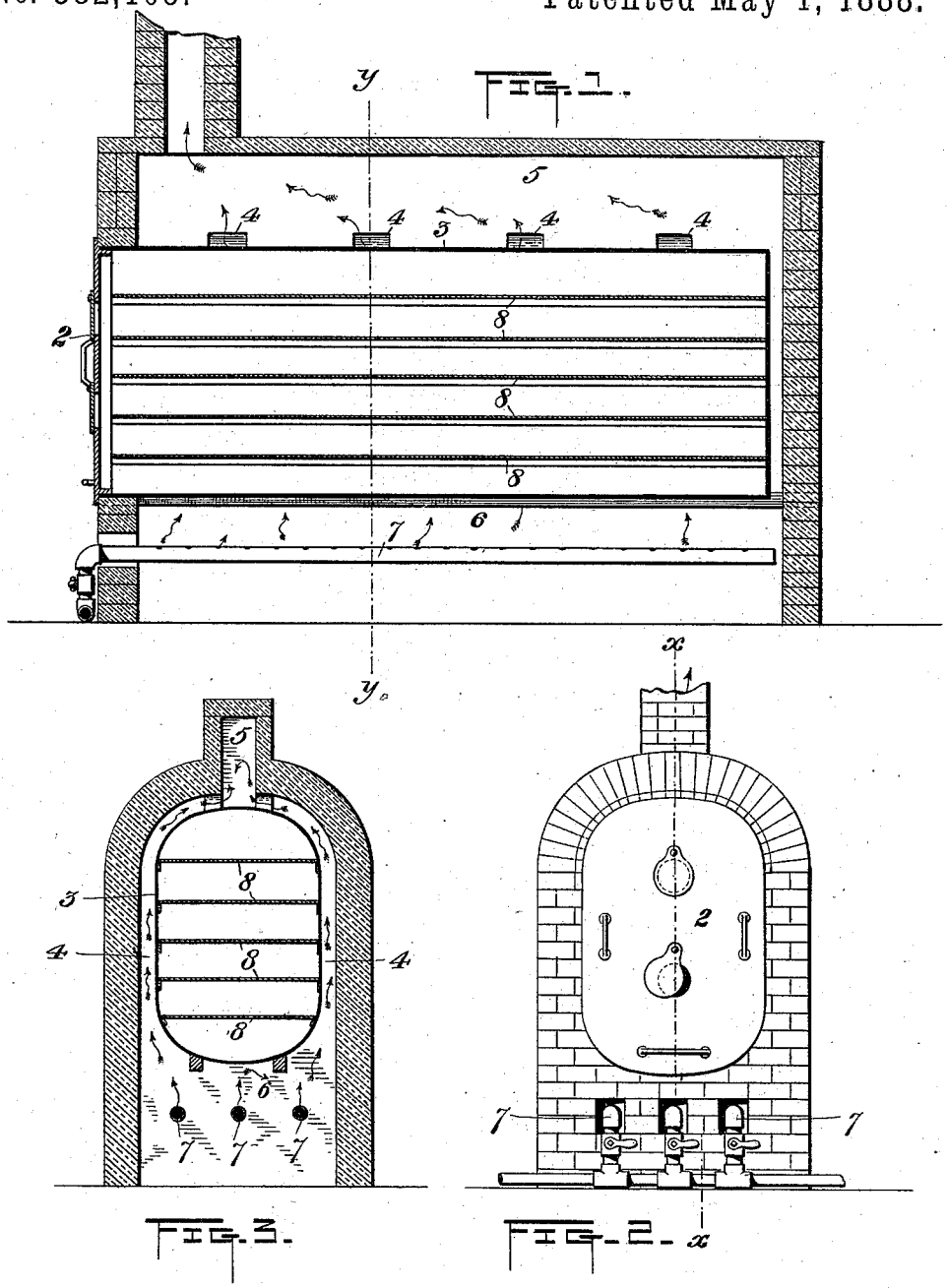
WITNESSES.
J. K. Smith.
C. Haukley.
INVENTOR.
Henry Edward Mueller.
by W. Bakewell & Sons.
his Attorneys.

UNITED STATES PATENT OFFICE.

HENRY E. MUELLER, OF PITTSBURG, PENNSYLVANIA.

METHOD OF COLORING GLASSWARE.

SPECIFICATION forming part of Letters Patent No. 382,105, dated May 1, 1888.

Application filed March 3, 1888. Serial No. 266,020. (No model.)

*To all whom it may concern:*

Be it known that I, HENRY E. MUELLER, of Pittsburg, in the county of Allegheny and State of Pennsylvania, have invented a new and useful Improvement in the Method of Coloring Glassware; and I do hereby declare the following to be a full, clear, and exact description thereof.

My invention relates to a certain new method of coloring lime glassware, which I shall describe with reference to the accompanying drawings, in which is shown a form of muffle or furnace by means of which my invention may be practiced.

In the drawings, Figure 1 is a longitudinal vertical section of the muffle on the line $xx$ of Fig. 2. Fig. 2 is a front view thereof, and Fig. 3 is a vertical cross-section on the line $y$ $y$ of Fig. 1.

Like symbols of reference indicate like parts in each.

The muffle 3 is a chamber having at the front a removable door, 2, by which the chamber may be opened to introduce the glassware or closed to confine it therein and to exclude air, and inside the muffle are a series of shelves or supports, 8, on which the glassware is placed. The muffle is surrounded by a flue, 4, which communicates with a squirrel-tail flue, 5, at the top, and at the base communicates with the combustion-chamber 6 under the muffle, in which are the gas-burners 7. The burners are preferably three or more in number and extend from end to end of the muffle.

In practicing my invention, for the purpose of coloring glassware—*e. g.*, lantern-globes or other articles—with a ruby color, I first paint the surface of the glass with a suitable metallic pigment of copper. The following I have found to be very suitable for the purpose: An oxide or sulphate of copper, about six pounds; yellow ocher, about four pounds, and pulverized charcoal, about one pound. These are ground together in a paint-mill with an addition of sufficient molasses or similar substance to enable the pigment to be easily applied to the glass and to cause it to adhere thereto. I wish it to be understood, however, that my invention does not reside in the use of the particular compound, since other suitable copper or gold pigments may be employed; but it consists in the method of treating the glass after the pigment has been applied, for the purpose of producing a better and cheaper color than has heretofore been possible.

When the surface of the glass article has been coated with the pigment, as above described, it is placed in the muffle-chamber 3, and when the muffle is conveniently full it is closed and the gas-burners 7 ignited, so as to raise it to a high degree of heat. When the article has been heated sufficiently to change the pigment first to a white color and then to a light brown, some or all of the gas-burners are turned down and the muffle allowed to cool partially for a time—say about fifteen minutes. Then the heat is somewhat increased, and bituminous coal—say about one peck for a muffle of the size shown in the drawings—is thrown into the muffle-chamber under the shelves 8, and care is taken to close the muffle sufficiently tight to exclude air therefrom. The heat of the burners distills the coal and fills the chamber with the coal-gas, which has the effect of changing the surface of the article to a yellowish-green color. After all or nearly all of the coal has been coked—say after forty-five minutes or one hour—the gas is turned off, and after allowing the muffle to cool the glassware is removed and pigment washed from it. It is then replaced in the muffle for the purpose of finally developing the ruby color, and a larger quantity of fresh bituminous coal—say about three pecks—is charged into the muffle under the shelves. The muffle is then closed and a slow heat applied thereto by means of one or more of the gas-burners. The distillation of the coal thus caused smokes the glass until it assumes a polished black appearance, and when the coal is coked—say after six or eight hours—the coke is withdrawn and the gas is turned on, so as to increase the heat of the muffle to a temperature of about 110°. The oven is then cooled, and when the glassware is removed and washed it will be found to be of a beautiful color. Instead of bituminous coal it is possible to use pitch, tar, resin, or dry wood as equivalent substitutes therefor.

I have reduced my invention to practical use and find that it is of great advantage, and that by its use I am enabled to color glassware more cheaply and with better results than have heretofore been possible.

The feature of this process in which my invention consists, and which I desire to claim, broadly, is the use of the coal-gas in the first heat for the purpose of producing the green tinge on the article, and thus to prepare it for afterward receiving the final development of the ruby color. I believe the application of gas at this stage of the process to be altogether new and to be the cause of the very good results which I have obtained.

I claim—

1. The method hereinbefore described of coloring glassware, which consists in painting glassware with a pigment, burning the pigment, and subjecting the glassware in a closed muffle to the action of coal-gas, substantially as and for the purposes described.

2. The method hereinbefore described of coloring glassware, which consists in painting glassware with a pigment, burning the pigment, subjecting the glassware in a closed muffle to the action of coal-gas, and, finally, developing the color, substantially as and for the purposes described.

In testimony whereof I have hereunto set my hand this 27th day of February, A. D. 1888.

HENRY E. MUELLER.

Witnesses:
W. B. CORWIN,
THOMAS W. BAKEWELL.